US009578262B2

(12) United States Patent
Dowaki

(10) Patent No.: US 9,578,262 B2
(45) Date of Patent: Feb. 21, 2017

(54) RADIATION IMAGING APPARATUS, CONTROL METHOD THEREFOR, AND RADIATION INSPECTION APPARATUS

(71) Applicant: CANON KABUSHIKI KAISHA, Tokyo (JP)

(72) Inventor: Kanako Dowaki, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 115 days.

(21) Appl. No.: 14/590,139

(22) Filed: Jan. 6, 2015

(65) Prior Publication Data

US 2015/0204988 A1 Jul. 23, 2015

(30) Foreign Application Priority Data

Jan. 22, 2014 (JP) ................... 2014-009784

(51) Int. Cl.
| | |
|---|---|
| *H04N 5/347* | (2011.01) |
| *H04N 5/361* | (2011.01) |
| *H04N 5/32* | (2006.01) |
| *G01T 1/24* | (2006.01) |
| *H04N 5/343* | (2011.01) |
| *H04N 5/345* | (2011.01) |
| *H04N 5/355* | (2011.01) |

(52) U.S. Cl.
CPC ............... *H04N 5/32* (2013.01); *G01T 1/247* (2013.01); *H04N 5/343* (2013.01); *H04N 5/3456* (2013.01); *H04N 5/3559* (2013.01)

(58) Field of Classification Search
CPC .... H04N 5/347; H04N 5/361; H04N 5/37452; H04N 5/37457; H04N 5/363; H04N 5/3559; H04N 5/3575; H04N 5/378; H04N 5/37455; H04N 5/3745; H04N 5/374; H04N 5/365; H04N 5/3598; H04N 5/359; H04N 5/351; H04N 5/345; H04N 5/343; H04N 5/3415; H04N 5/335; H04N 5/325; H04N 5/32; H04N 5/2254; H04N 9/045; H04N 3/155; H04N 3/1562; H04N 3/1568; G01T 1/24; G01N 23/04; G02B 13/0015; G02B 5/20
USPC ................. 348/308, E3.021, E3.02, E3.018, 311,348/348, E5.091, 241, 362, 322, 312, 279,348/222.1, E9.01, E5.88, E5.079, E5.031; 250/370.08, 370.09
See application file for complete search history.

(56) References Cited

U.S. PATENT DOCUMENTS 5,848,123 A * 12/1998 Strommer .......... H04N 5/37206
 250/370.09
6,930,716 B2 * 8/2005 Yoshida ................ H04N 9/045
 348/312

(Continued)

FOREIGN PATENT DOCUMENTS

| JP | 2003-126072 | 5/2003 |
|---|---|---|
| JP | A 2003-126072 | 5/2003 |

*Primary Examiner* — David A Vanore
(74) *Attorney, Agent, or Firm* — Fitzpatrick, Cella, Harper & Scinto

(57) ABSTRACT

A radiation imaging apparatus, comprising a plurality of sensors, a holding unit configured to hold a signal level of each sensor, a monitor unit configured to monitor the signal levels, and a control unit configured to control each sensor so as to detect radiation with a first sensitivity and a second sensitivity higher than the first sensitivity, wherein the control unit performs first control to cause the monitor unit to monitor signal levels with the second sensitivity, and performs second control to select some sensors out of the plurality of sensors based on monitoring results obtained in the first control.

17 Claims, 14 Drawing Sheets

(56) References Cited

U.S. PATENT DOCUMENTS

| | | | | |
|---|---|---|---|---|
| 8,466,533 B2* | 6/2013 | Tian | ................... | H01L 27/14603 250/370.08 |
| 8,894,280 B2* | 11/2014 | Topfer | ................... | A61B 6/585 250/252.1 |
| 9,106,851 B2* | 8/2015 | Fenigstein | ............. | H04N 5/355 |
| 9,279,893 B2* | 3/2016 | Niwa | ....................... | H04N 5/32 |
| 9,354,184 B2* | 5/2016 | Dowaki | .................. | H04N 5/32 |
| 2003/0086523 A1 | 5/2003 | Tashiro et al. | ................ | 378/98.8 |
| 2005/0018065 A1* | 1/2005 | Tashiro | ............. | H01L 27/14658 348/308 |
| 2006/0279650 A1* | 12/2006 | Watanabe | .............. | H04N 3/155 348/308 |
| 2007/0051976 A1* | 3/2007 | Moody | ............. | H01L 27/14609 257/186 |
| 2010/0141790 A1* | 6/2010 | Hashimoto | .......... | H04N 5/3575 348/222.1 |
| 2010/0141812 A1* | 6/2010 | Hirota | ..................... | H04N 9/045 348/279 |
| 2011/0102644 A1* | 5/2011 | Posamentier | .......... | H04N 5/359 348/241 |
| 2012/0075515 A1* | 3/2012 | Dowaki | .................. | H04N 5/347 348/311 |
| 2014/0036118 A1* | 2/2014 | Dowaki | ............... | H04N 5/2173 348/294 |
| 2014/0037056 A1* | 2/2014 | Naito | ..................... | G01N 23/04 378/62 |
| 2015/0189194 A1* | 7/2015 | Tajima | .................. | A61B 6/4233 378/62 |
| 2015/0204988 A1* | 7/2015 | Dowaki | .................. | H04N 5/343 378/62 |
| 2015/0296151 A1* | 10/2015 | Dowaki | .................. | H04N 5/343 250/370.08 |
| 2015/0350584 A1* | 12/2015 | Fenigstein | ............. | H04N 5/355 250/208.1 |

* cited by examiner

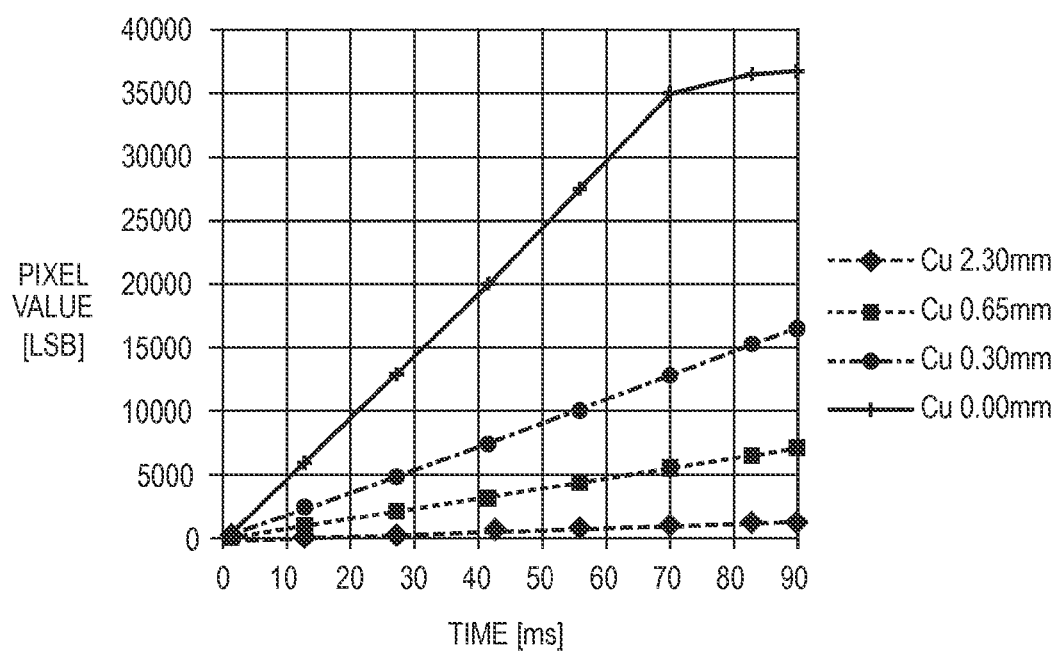
F I G. 11

US 9,578,262 B2

RADIATION IMAGING APPARATUS, CONTROL METHOD THEREFOR, AND RADIATION INSPECTION APPARATUS

BACKGROUND OF THE INVENTION

Field of the Invention

The present invention relates to a radiation imaging apparatus, a control method therefor, and a radiation inspection apparatus.

Description of the Related Art

A radiation imaging apparatus includes a plurality of sensors, and forms a radiation image of an object by using a signal based on the amount of charges generated in each sensor.

Japanese Patent Laid-Open No. 2003-126072 (patent literature 1) discloses a radiation imaging apparatus which monitors a signal level based on the amount of charges generated in each sensor after the start of the irradiation of radiation, and starts signal readout even before the end of the irradiation of radiation based on the monitoring result. According to patent literature 1, the timing of the start of signal readout is controlled in accordance with an imaging target (for example, the lung or stomach) of an object.

Some radiation imaging apparatus uses a sensor capable of switching sensitivity modes (a high-sensitivity mode, a low-sensitivity mode, and the like). Japanese Patent Laid-Open No. 2003-126072 gives no consideration to how to control the timing of the start of signal readout depending on in which one of the sensitivity modes imaging is performed.

SUMMARY OF THE INVENTION

The present invention provides a technique advantageous in acquiring a high-quality radiation image in accordance with the imaging target of an object in a radiation imaging apparatus having a plurality of sensitivity modes.

One of the aspects of the present invention provides a radiation imaging apparatus, comprising a plurality of sensors, a holding unit configured to hold a signal level based on amounts of charges generated in each sensor, a monitor unit configured to monitor the signal levels in the holding unit, and a control unit configured to control each sensor so as to detect radiation with a first sensitivity and a second sensitivity higher than the first sensitivity, wherein the control unit performs first control to cause the monitor unit to monitor signal levels based on the amounts of charges generated in the plurality of sensors with the second sensitivity, and performs second control to select some sensors out of the plurality of sensors based on monitoring results obtained in the first control.

Further features of the present invention will become apparent from the following description of exemplary embodiments with reference to the attached drawings.

BRIEF DESCRIPTION OF THE DRAWINGS

FIG. 11 is a graph for explaining the radiation irradiation time dependence of signal level;

DESCRIPTION OF THE EMBODIMENTS (Example of Arrangement of Radiation Imaging Apparatus)

Figure 1:
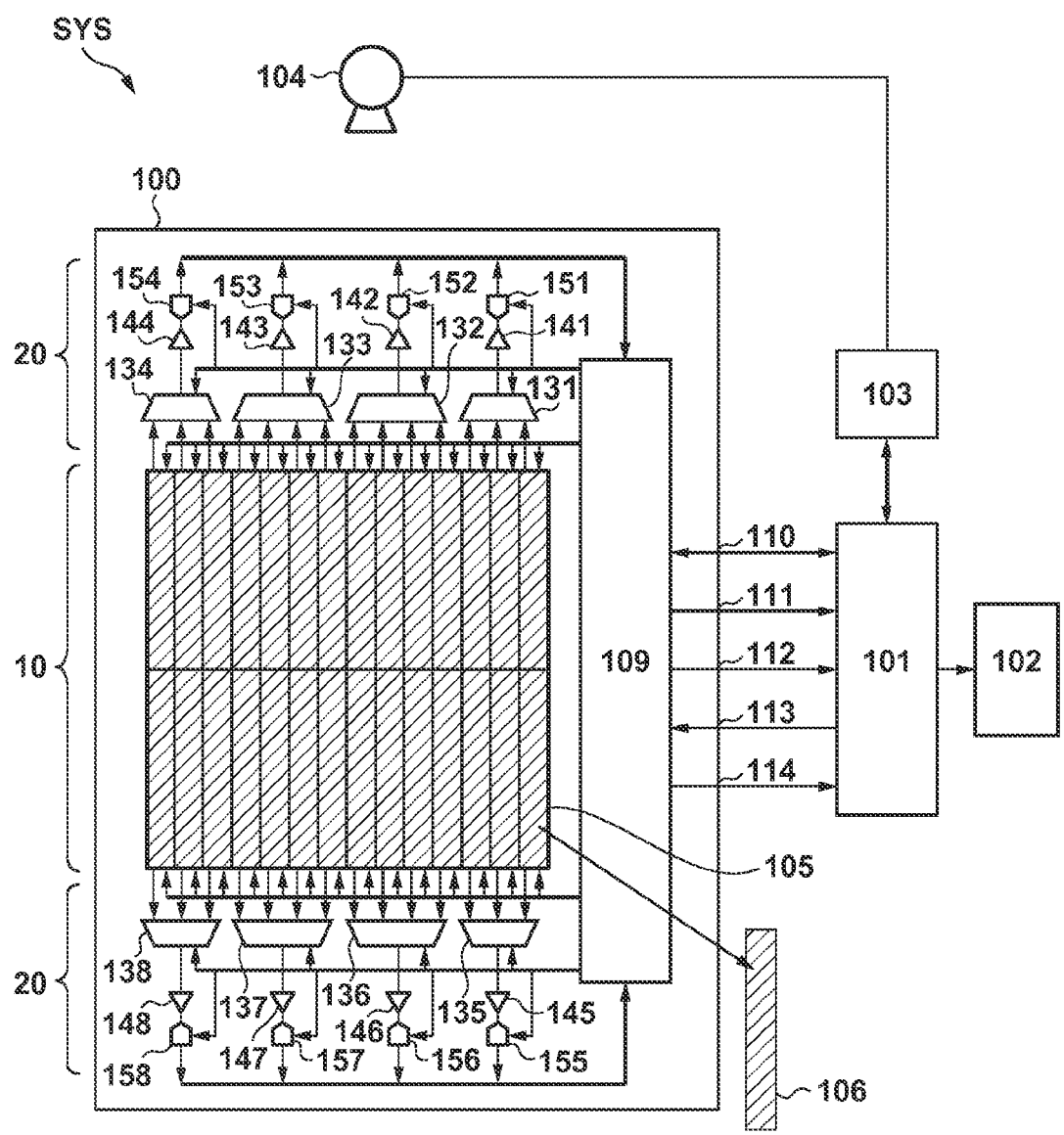
FIG. 1 is a block diagram for explaining an example of the arrangement of a radiation imaging system.

FIG. 1 shows an example of the arrangement of a radiation imaging system SYS typified by a radiation imaging apparatus. The radiation imaging system SYS includes a radiation imaging apparatus 100 (to be referred to as the imaging apparatus 100 hereinafter), a radiation source 104, a radiation source control unit 103, a processing unit 101, and a display unit 102. The radiation source 104 generates radiation. The radiation source control unit 103 controls the radiation source 104. The processing unit 101 performs image processing and system control. The display unit 102 includes a display which notifies the user of the state of the imaging apparatus 100, an imaging result, and the like.

When performing radiation imaging, the processing unit 101 can synchronously control the imaging apparatus 100 and the radiation source control unit 103. The imaging apparatus 100 detects the radiation (X-rays, α-rays, β-rays, γ-rays, or the like) transmitted through a subject to be examined. The processing unit 101 and the like perform predetermined processing on the radiation to generate image data based on the radiation. The display unit 102 displays the image data as a radiation image.

The imaging apparatus 100 includes a sensor array 10 having a sensor panel 105, signal readout units 20 which read out signals from the sensor array 10, and a control unit 109 which controls each unit. The sensor array 10 is a sensor area in which a plurality of sensors are arranged. The plurality of sensors are arranged to form a plurality of rows and a plurality of columns.

The sensor panel 105 is formed by tiling (two-dimensionally arranging) a plurality of sensor units 106 on a plate-like base. With this arrangement, the large-size sensor panel 105 can be formed. Note that a plurality of sensors are arranged in each sensor unit 106. In this case, the arrangement obtained by tiling the plurality of sensor units 106 to form 14 columns×2 rows is exemplified. However, the present invention is not limited to this number of sensor units or this arrangement.

Each sensor unit 106 is a unit chip manufactured by a known semiconductor manufacturing method using a silicon wafer. The adjacent sensor units 106 may be physically separated by dicing or may not be separated. For example, each sensor unit 106 formed on the silicon wafer is inspected, and the sensor panel 105 can be formed by selectively using the sensor units 106 whose inspection results satisfy a predetermined criterion. Note that referring to FIG. 1, the solid lines indicate that the sensor units are diced, and the broken lines indicate that the sensor units are not diced.

A scintillator (not shown) which converts radiation into light can be provided on the sensor array 10. Note that a known sensor which performs photoelectric conversion may be used as each sensor. This makes it possible to obtain an electrical signal based on the irradiated radiation dose.

The signal readout unit 20 can include, for example, multiplexers 131 to 138, signal amplifying units 141 to 148 including differential amplifiers, and A/D conversion units 151 to 158 which perform analog/digital conversion (A/D conversion).

A plurality of electrodes for inputting/outputting electrical signals or supplying power can be arranged on the upper side portion and lower side portion of the sensor panel 105. The electrodes can be connected to external circuits via a flying lead type printed wiring board (not shown). For example, each signal readout unit 20 reads out signals from the sensor array 10 via the electrodes, and the sensor array 10 receives control signals from the control unit 109 via the electrodes.

The control unit 109 communicates control commands and synchronization signals with, for example, the processing unit 101, and outputs image data to the processing unit 101. In addition, the control unit 109 controls the sensor array 10 and each of the remaining units to perform, for example, drive control and operation mode control of each sensor. Furthermore, the control unit 109 composites, into one frame data, image data (digital data) from the respective sensor units 106 which are A/D-converted by the corresponding A/D conversion units 151 to 158 of each signal readout unit 20, and outputs the data to the processing unit 101.

The control unit 109 and the processing unit 101 exchange control commands, control signals, and image data via various types of interfaces. The processing unit 101 outputs setting information such as an operation mode and various types of parameters and imaging information to the control unit 109 via a control interface 110. The control unit 109 also outputs apparatus information such as the operation state of the imaging apparatus 100 to the processing unit 101 via the control interface 110. In addition, the control unit 109 outputs the image data obtained by the imaging apparatus 100 to the processing unit 101 via an image data interface 111. Furthermore, the control unit 109 notifies, by using a READY signal 112, the processing unit 101 that the imaging apparatus 100 is ready for imaging. In response to the READY signal 112 from the control unit 109, the processing unit 101 notifies the control unit 109 of the irradiation start (exposure) timing of radiation by using an external synchronization signal 113. The control unit 109 also starts radiation irradiation by outputting a control signal to the radiation source control unit 103 while an exposure permission signal 114 is in an enabled state.

Figure 2:
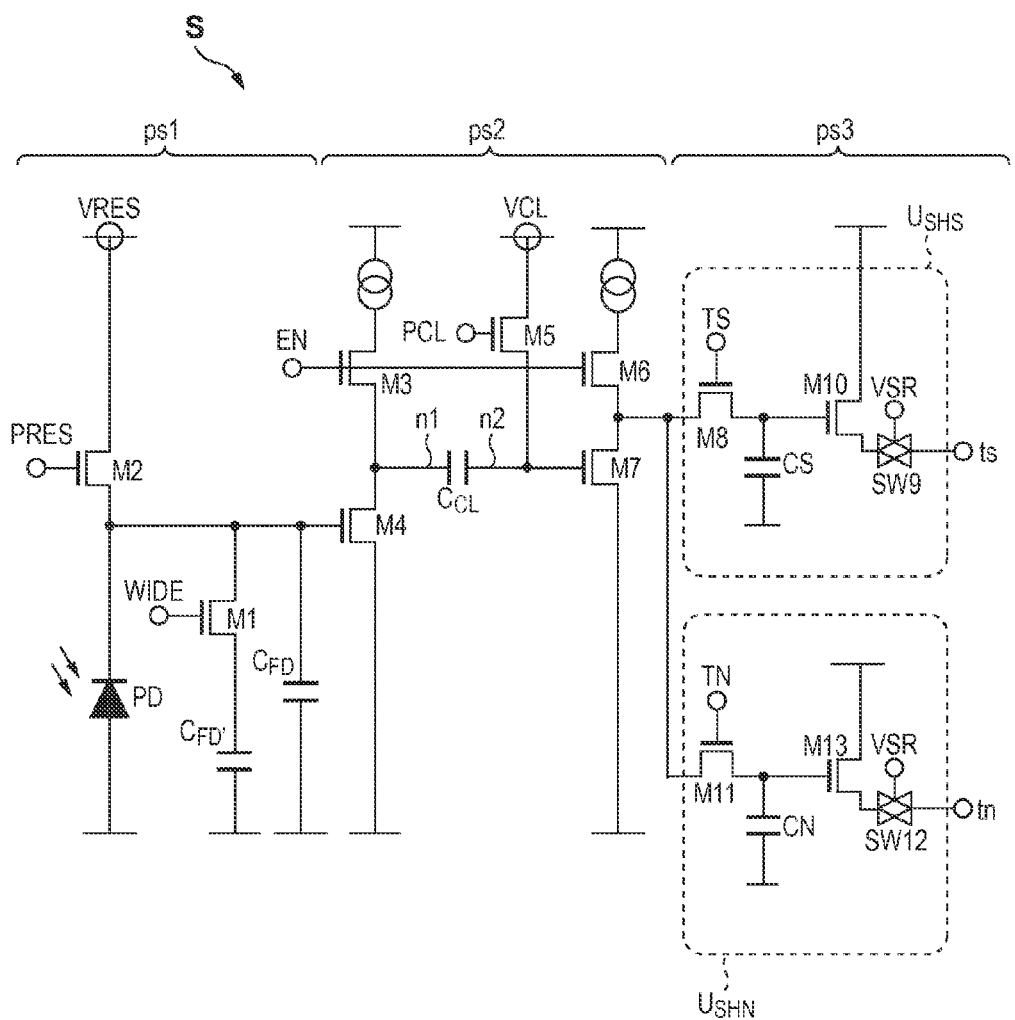
FIG. 2 is a circuit diagram for explaining an example of the arrangement of a sensor.

FIG. 2 exemplifies the circuit arrangement of a unit sensor S forming the sensor array 10. The sensor S can include, for example, a first portion ps1, a second portion ps2, and a third portion ps3.

The first portion ps1 can include a photodiode PD, transistors M1 to M3, a floating diffusion capacitor $C_{FD}$ (to be referred to as the FD capacitor $C_{FD}$ hereinafter), and a sensitivity switching capacitor $C_{FD}'$. The photodiode PD is a photo-electric conversion element, and converts the light generated by the above scintillator in accordance with irradiated radiation into an electrical signal. More specifically, the photodiode PD generates charges of an amount corresponding to the light, and outputs the voltage of the FD capacitor $C_{FD}$ corresponding to the amount of generated charges to the second portion ps2.

In addition, the sensitivity switching capacitor $C_{FD}'$ is used to switch between sensitivities for radiation from the sensor S, and is connected to the photodiode PD via the transistor M1 (switching element). Activating a signal WIDE will render the transistor M1 conductive to output the voltage of the composition capacitor of the FD capacitor $C_{FD}$ and the capacitor $C_{FD}'$ to the second portion ps2.

In this case, the sensor S is set in a low-sensitivity mode (first mode) when the signal WIDE is at High level, and is set in a high-sensitivity mode (second mode) when the signal WIDE is at Low level. In this manner, the sensor S can change the sensitivity for radiation depending on whether to use the capacitor $C_{FD}'$.

In addition, activating a signal PRES makes the transistor M2 initialize the charges in the photodiode PD and reset the voltage output to the second portion ps2.

The second portion ps2 can include transistors M3 to M7, a clamp capacitor $C_{CL}$, and a constant current source. The transistor M3, the transistor M4, and the constant current source (for example, a transistor having a current mirror arrangement) are connected in series to form a current path. Activating an enable signal EN input to the gate of the transistor M3 will set the transistor M4 which receives a voltage from the first portion ps1 in an operating state. In this manner, a source follower circuit is formed to output a voltage corresponding to a voltage from the first portion ps1.

On the subsequent stage, a clamp circuit constituted by the transistors M5 to M7 and the clamp capacitor $C_{CL}$ is provided. More specifically, one terminal n1 of the clamp capacitor $C_{CL}$ is connected to the node between the transistor M3 and the transistor M4 of the first portion ps1. The other terminal n2 is connected to the transistor M5 functioning as a clamp switch. In addition, the transistor M6, the transistor M7, and the constant current source are connected in series to form a current path. The other terminal n2 is connected to the gate of the transistor M7. This arrangement removes kTC noise (so-called reset noise) generated in the photodiode PD of the first portion ps1.

More specifically, a voltage corresponding to the voltage from the first portion ps1 at the time of resetting described above is input to the terminal n1 of the clamp capacitor $C_{CL}$. In addition, activating a clamp signal PCL will render the transistor M5 conductive to input a clamp voltage VCL to the terminal n2 of the clamp capacitor $C_{CL}$. In this manner, the potential difference generated between the two terminals n1 and n2 of the clamp capacitor $C_{CL}$ is clamped as a noise component. Thereafter, a change in voltage accompanying the generation and accumulation of charges in the photodiode PD is output as a signal component.

In addition, the enable signal EN is also input to the gate of the transistor M6 and activated to set the transistor M7 in an operating state. In this manner, a source follow circuit is formed to output a voltage corresponding to the gate voltage of the transistor M7 to the third portion ps3.

The third portion ps3 includes transistors M8, M10, M11, and M13, analog switches SW9 and SW12, and capacitors CS and CN. The unit formed by the transistors M8 and M10, the analog switch SW9, and the capacitor CS will be referred to as a first unit $U_{SHS}$.

In the first unit $U_{SHS}$, the transistor M8 and the capacitor CS form a sample/hold circuit which functions as a holding unit which holds an output value from the second portion ps2. More specifically, by switching the state (the conductive state or non-conductive state) of the transistor M8 using a control signal TS, the signal (the signal based on a light component) obtained from the second portion ps2 is held in the capacitor CS. In addition, the transistor M10 performs a source follower operation to function as an amplifier. This amplifies the signal. The amplified signal is output from a terminal is by rendering the analog switch SW9 conductive using a control signal VSR.

With this arrangement, it is possible to monitor a signal level based on the amount of charges generated in each sensor and to sample the signal level. In other words, a voltage based on the amount of charges generated in each sensor is held in the capacitor CS, and it is possible to perform non-destructive readout of a signal level based on the amount of charges at an arbitrary timing.

Like the first unit $U_{SHS}$, the transistors M11 and M13, the analog switch SW12, and the capacitor CN form a second unit $U_{SHN}$ which outputs a signal from a terminal tn.

Note that, as will be described later, in the second unit $U_{SHN}$, a reference signal is held, and each signal readout unit 20 reads out the difference between the reference signal level and the signal level based on the amount of charges generated in each sensor. This removes FPN (Fixed Pattern Noise) originating from the second portion ps2.

A method of driving the sensor S in, for example, a case in which the high-sensitivity mode is set (the control signal WIDE is at Low level) will be described below with reference to FIG. 3.

Figure 3:
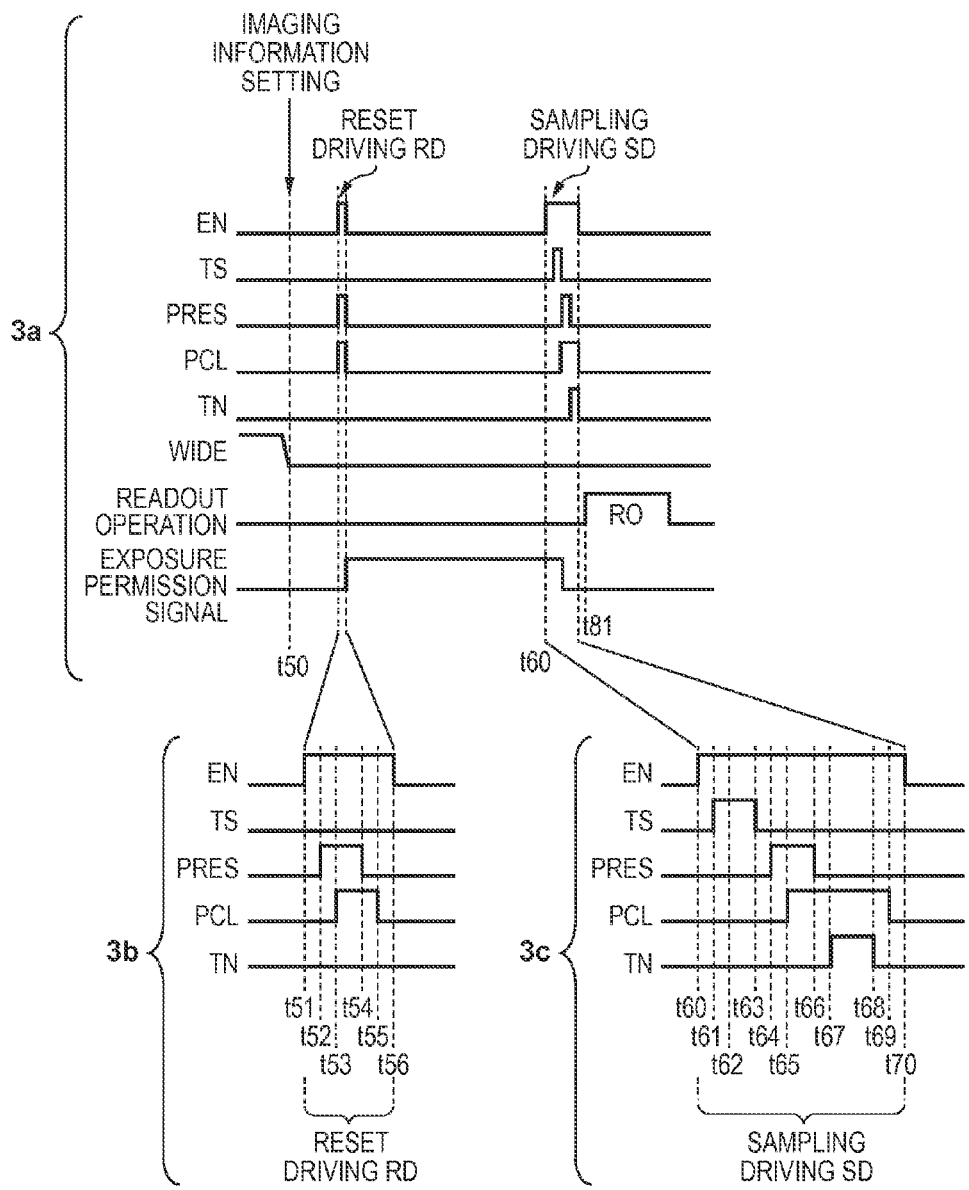
FIG. 3 is a timing chart for explaining an example of a method of driving a sensor.

As indicated by (A) in FIG. 3, first of all, the user sets information necessary to perform imaging such as setting of an operation mode at time t50. At time t51, reset driving RD is performed to initialize each sensor S and each holding unit (capacitors CS and CN). At time t60, sampling driving SD is performed to read out an image signal. At time t81, readout operation RO is performed to read out a signal from the sensor array 10.

(B) in FIG. 3 shows a specific timing chart for the reset driving RD. In the reset driving RD, a reset operation is performed together with the operation of clamping, as a noise component, an output component obtained at the time of resetting.

At time t51, the enable signal EN is set at High level to render the transistors M3 and M6 conductive. This makes the transistors M4 and M7 be ready for a source follower operation.

At time t52, a signal PRES is set at High level to render the transistor M2 for resetting conductive. With this operation, the photodiode PD is connected to a reference voltage VRES to reset the photodiode PD and also reset the voltage of the capacitor $C_{FD}$. In addition, a voltage corresponding to the gate voltage of the transistor M4 immediately after resetting is input to one terminal n1 (the terminal on the transistor M4 side) of the clamp capacitor $C_{CL}$. Note that in the case of the low-sensitivity mode, the signal WIDE may be set at High level at time t52 to render the transistor M1 for sensitivity switching conductive and reset the voltage of the sensitivity switching capacitor $C_{FD}'$.

At time t53, the signal PCL is set at High level to render the transistor M5 for the above clamping operation conductive. With this operation, the clamp voltage VCL is input to the other terminal n2 (the terminal on the transistor M7 side) of the clamp capacitor $C_{CL}$. In addition, at time t53, signals TS and TN may be set at High level to render the transistors M8 and M11 for the above sampling operation conductive and initialize the capacitors CS and CN.

At time t54, the signal PRES is set at Low level to render the transistor M2 non-conductive to set the terminal n1 of the clamp capacitor $C_{CL}$ to a voltage corresponding to the gate voltage of the transistor M4 immediately resetting. Note that in the case of the low-sensitivity mode, the signal WIDE is set at Low level to render the transistor M1 non-conductive, thereby fixing the capacitor $C_{FD}'$ to a voltage obtained immediately after resetting.

At time t55, the signal PCL is set at Low level to render the transistor M5 non-conductive. This makes the clamp capacitor $C_{CL}$ hold charges corresponding to the potential difference between the terminals n1 and n2 (the potential difference between a voltage based on the reference voltage VRES and the reference voltage VCL), thereby completing clamping of the above kTC noise. In addition, when the capacitors CS and CN are initialized at time t53, the signals TS and TN are set at Low level at time t55 to render the transistors M8 and M11 non-conductive, thereby fixing the voltages of the capacitors CS and CN.

At time t56, the enable signal EN is set at Low level to render the transistors M3 and M6 non-conductive. This sets the transistors M4 and M7 in a non-operating state. Thereafter, the exposure permission signal 114 described above is set at High level (permitted state) to make the photodiode PD generate and accumulate charges corresponding to the irradiated radiation dose in accordance with radiation irradiation.

In the above manner, a series of operations in the reset driving RD is complete. That is, in the reset driving RD, the photodiode PD is reset, the clamp capacitor $C_{CL}$ holds a voltage corresponding to kTC noise originating from the photodiode PD of the first portion ps1, and the capacitors CS and CN are initialized, as needed. Note that the reset driving RD is collectively performed for all the sensors so as to prevent the occurrence of a control timing shift, thereby maintaining the continuity of data between adjacent sensor units and adjacent sensors.

(C) in FIG. 3 shows a specific timing chart for the sampling driving SD. In the sampling driving SD, the operation of holding a signal level corresponding to the amount of charges in the sensor S in the capacitor CS is performed. In the sampling driving SD, the capacitor CN holds a noise level corresponding to fixed pattern noise such as thermal noise, 1/f noise, a temperature difference, and process variations depending on the circuit arrangement of the second portion ps2.

At time t60, the enable signal EN is set at High level to render the transistors M3 and M6 conductive. This makes the transistors M4 and M7 be ready for a source follower operation. The gate voltage of the transistor M4 has changed in accordance with the amount of charges generated and accumulated in the photodiode PD. A voltage corresponding to the changed gate voltage is input to one terminal n1 of the clamp capacitor $C_{CL}$, and the potential of the terminal n1 changes. The potential of the other terminal n2 of the clamp capacitor $C_{CL}$ changes in accordance with a change in the potential of the terminal n1. In this case, as described above, the clamp capacitor $C_{CL}$ is holding a voltage corresponding to kTC noise, and hence outputs the amount of change in potential as a signal component to the third portion ps3.

At time t61, the signal TS is set at High level to render the transistor M8 conductive to make the capacitor CS hold an output voltage from the second portion ps2. That is, the voltage of the capacitor CS becomes the output voltage of the second portion ps2 (a voltage corresponding to the gate voltage of the transistor M7).

At time t62, the exposure permission signal 114 is set at Low level (inhibited) because sampling has been started at time t61.

At time t63, the signal TS is set at Low level to render the transistor M8 non-conductive to fix the output voltage of the second portion ps2 to the capacitor CS.

That is, at times t60 to t63, the capacitor CS holds a signal level corresponding to the amount of charges generated in the sensor S.

At time t64, the signal PRES is set at High level to render the transistor M2 for resetting conductive. This resets the voltages of the FD capacitor $C_{FD}$ (and capacitor $C_{FD}'$) to the reference voltage VRES. In addition, the voltage at the terminal n1 becomes the same as that set at time t52.

At time t65, the signal PCL is set at High level to render the transistor M5 conductive to input the clamp voltage VCL to the other terminal n2 of the clamp capacitor $C_{CL}$ (the terminal on the transistor M7 side).

At time t66, the signal PRES is set at Low level to render the transistor M2 non-conductive. With this operation, the terminal n1 of the clamp capacitor $C_{CL}$ is set to a voltage corresponding to the gate voltage of the transistor M4 immediately after resetting. Note that in the case of the low-sensitivity mode, the capacitor $C_{FD}'$ can be fixed to a voltage immediately after resetting by setting the signal WIDE at Low level to render the transistor M1 non-conductive.

At time t67, the signal TN is set at High level to render the transistor M14 conductive. With this operation, the voltage of the capacitor CN becomes the output voltage second portion ps2 when the gate voltage of the transistor M7 is the reference voltage VCL.

At time t68, the signal TN is set at Low level to render the transistor M14 non-conductive, thereby fixing the voltage of the capacitor CN.

That is, at times t64 to t68, the capacitor CN holds a noise level corresponding to fixed pattern noise such as thermal noise, 1/f noise, a temperature difference, and process variations depending on the circuit arrangement of the second portion ps2.

Lastly, at time t69, the signal PCL is set at Low level to render the transistor M5 non-conductive. At time t70, the enable signal EN is set at Low level to render the transistors M3 and M6 non-conductive (set the transistors M4 and M7 in a non-operating state).

In the above manner, a series of operations in the sampling driving SD is complete. That is, in the sampling driving SD, the capacitor CS holds a signal level corresponding to the amount of charges in the sensor S, and the capacitor CN holds a voltage corresponding to the fixed pattern noise originating from the second portion ps2. Note that like the reset driving RD described above, the sampling driving SD can be collectively performed for all the sensors so as to prevent the occurrence of a control timing shift of each sensor unit 106.

Figure 4:
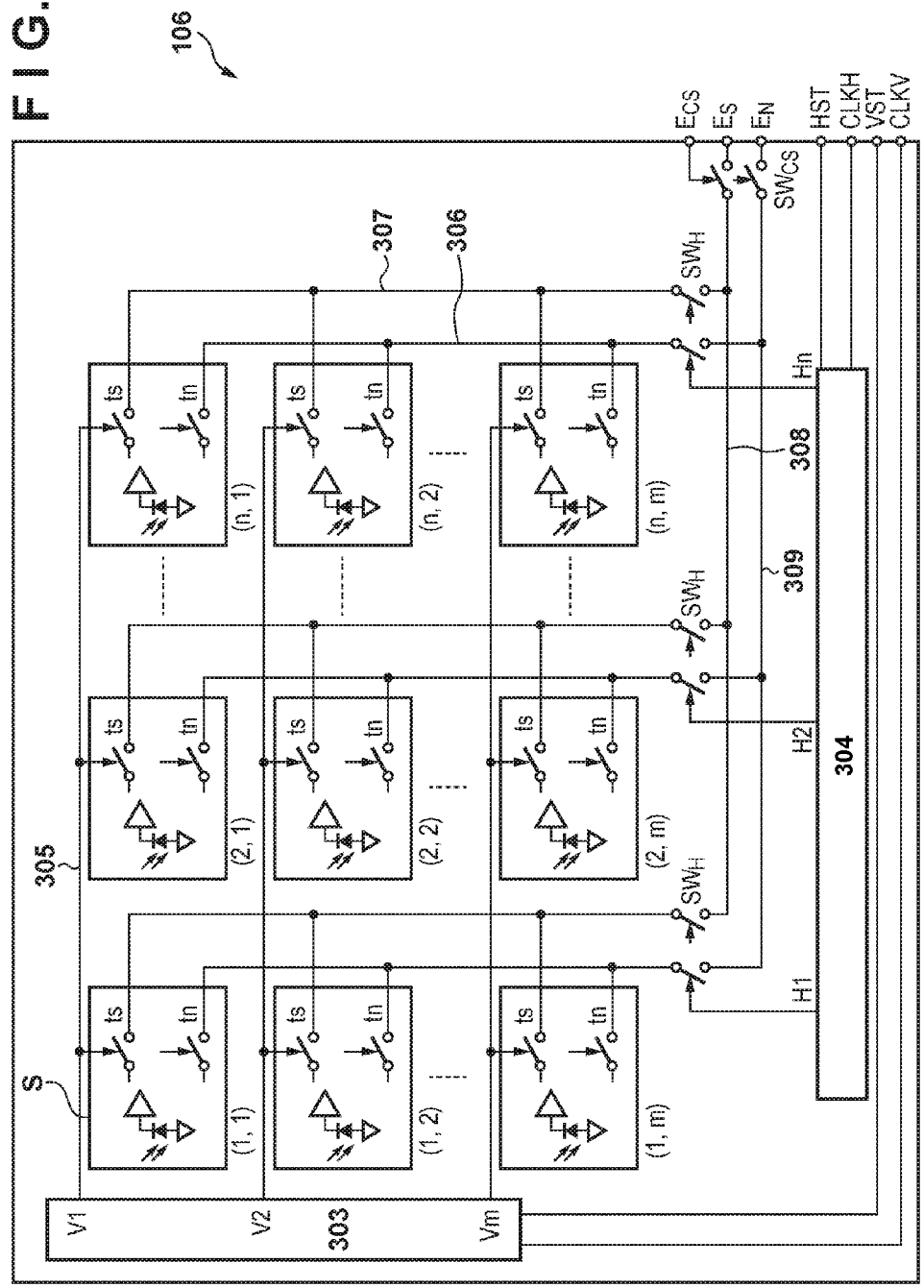
FIG. 4 is a block diagram for explaining an example of the arrangement of a sensor unit.

An example of the arrangement of each sensor unit 106 described above will be described next with reference to FIG. 4. As described above, the large-size sensor panel 105 can be formed by tiling the plurality of sensor units 106 on a base. Each sensor unit 106 includes a plurality of sensors S arranged in m rows×n columns, a vertical scanning circuit 303 for driving the respective sensors S, and a horizontal scanning circuit 304 for reading out signals from the respective sensors S.

The vertical scanning circuit 303 and the horizontal scanning circuit 304 are formed from, for example, shift registers, and operate based on control signals from the control unit 109 described above. The vertical scanning circuit 303 inputs control signals to the respective sensors S via control lines 305, and drives the respective sensors S on a row basis based on the control signals. For example, the vertical scanning circuit 303 functions as a row selecting unit, and selects the sensors S for signal readout on a row basis. In addition, the horizontal scanning circuit 304 functions as a column selecting unit, selects the sensors S on a column basis based on control signals, and makes the sensors S sequentially output signals (horizontal transferring).

In addition, each sensor unit 106 includes a terminal $E_S$ for reading out the signal level held in the capacitor CS of each sensor S and a terminal $E_N$ for reading out the noise level held in the capacitor CN. Each sensor unit 106 further includes a select terminal $E_{CS}$. Activating a signal received by the terminal $E_{CS}$ can read out a signal from each sensor S of the sensor unit 106 via the terminals $E_S$ and $E_N$.

More specifically, the terminals ts and tn of each sensor S described above are respectively connected to column signal lines 306 and 307 corresponding to the respective terminals. The column signal lines 306 and 307 are respectively connected to analog output lines 308 and 309 via switches $SW_H$ which are rendered conductive in response to control signals from the horizontal scanning circuit 304. Signals from the analog output lines 308 and 309 are output from the terminals $E_S$ and $E_N$ via switches $SW_{CS}$ which are rendered conductive in response to signals received by the terminal $E_{CS}$.

In addition, each sensor unit 106 includes terminals HST, CLKH, VST, and CLKV which receive control signals for controlling the vertical scanning circuit 303 and the horizontal scanning circuit 304. The terminal HST receives a start pulse input to the horizontal scanning circuit 304. The terminal CLKH receives a clock signal input to the horizontal scanning circuit 304. The terminal VST receives a start pulse input to the vertical scanning circuit 303. The terminal CLKV receives a clock signal input to the vertical scanning circuit 303. These control signals are input from the control unit 109.

With the arrangement exemplified above, the sensor unit 106 controls the sensors S on a row basis, and outputs signals held in the respective holding units on a column basis (performs horizontal transferring), thereby performing signal readout.

Figure 5:
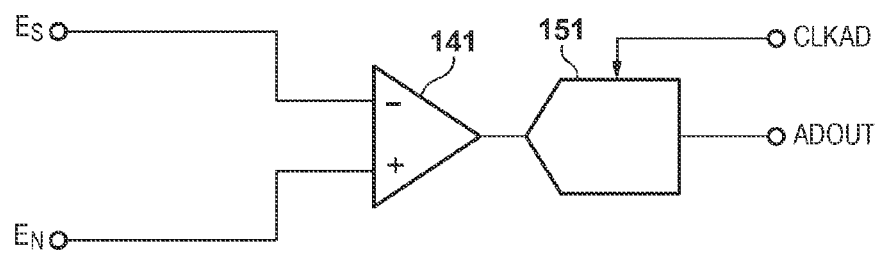
FIG. 5 is a circuit diagram for explaining an example of the arrangement of an A/D conversion unit.

FIG. 5 shows part of the circuit arrangement of the signal readout unit 20 described above. A signal from the terminal $E_S$ is input to the inverting input terminal of a signal amplifying unit 107. A signal from the terminal $E_N$ is input to the non-inverting input terminal of the signal amplifying unit 107. The signal amplifying unit 107 amplifies the difference between a signal from the terminal $E_S$ and a signal from the terminal $E_N$. The A/D conversion unit 108 A/D-converts the difference based on the clock signal input via a terminal CLKAD. With this arrangement, the above fixed pattern noise is removed, and image data (digital data) is obtained from each sensor unit 106. The data is then output to the control unit 109 via a terminal ADOUT. For the sake of descriptive convenience, the signal amplifying unit 141 and the A/D conversion unit 151 will be exemplified. However, the same applies to a case in which this arrangement further includes the multiplexer 131.

Figure 6:
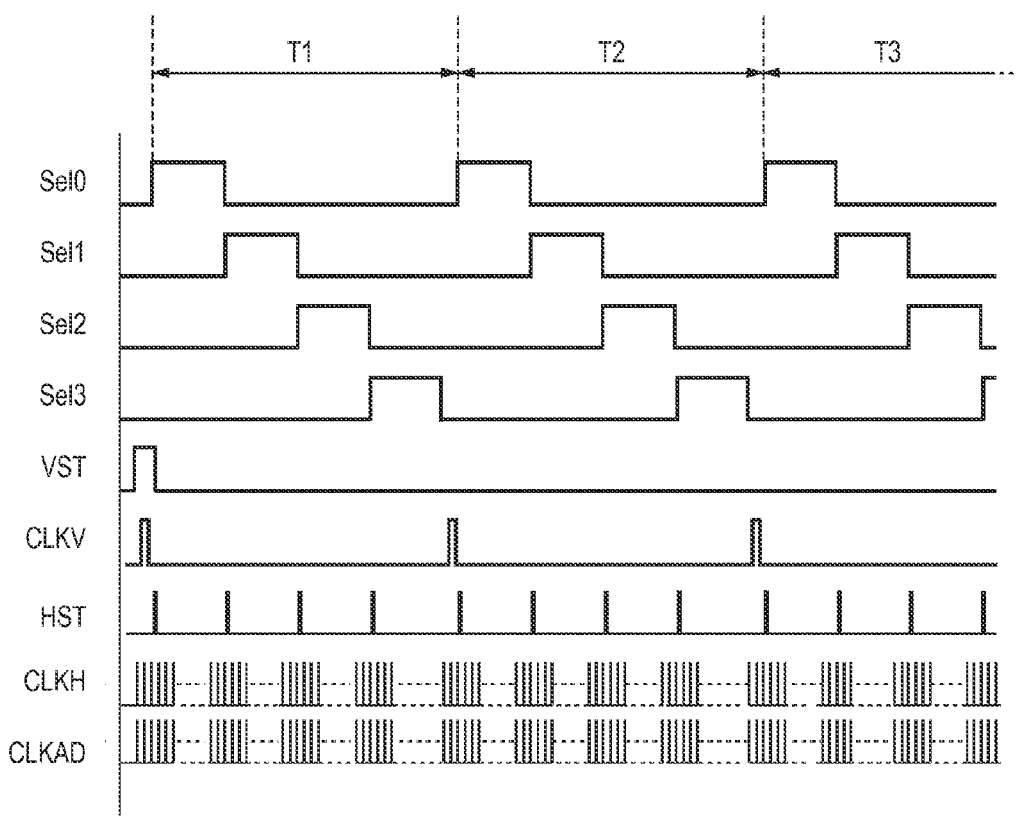
FIG. 6 is a timing chart for explaining an example of a control method for a radiation imaging apparatus.

A control method for the imaging apparatus 100 for a readout operation RO will be described next with reference to FIG. 6. FIG. 6 exemplifies a timing chart for the readout operation RO concerning each control signal. In this case, for the sake of descriptive convenience, the case of signal readout from four sensor units 106, that is, $106_0$ to $106_3$, will be described below.

Selection signals Sel, that is, Sel0 to Sel3, indicate control signals each for selecting a corresponding one of the sensor units $106_0$ to $106_3$ as a signal readout target. That is, the selection signal Sel is input to the terminal $E_{CS}$ of the corresponding sensor units 106. Other control signals are those input to the respective terminals. For example, a control signal input to the terminal VST is written as a signal VST (the same applies to other control signals).

The signal VST is a start pulse signal. This signal makes the vertical scanning circuit 303 select each sensor S on the first row. A signal CLKV is a clock signal. Every time this clock signal is received via the terminal CLKV, the selected row sequentially shifts from the first row to the mth row (that is, the respective sensors S sequentially selected on a row basis from the first row to the mth row). A signal HST is a start pulse signal. When this start pulse signal is received via the terminal HST, the horizontal scanning circuit 304 selects each sensor S on the first column. A signal CLKH is a clock signal. Every time this clock signal is received via the terminal CLKH, the selected column sequentially shifts from the first column to the nth column (that is, the respective sensors S sequentially selected on a column basis from the first column to the mth column). A signal CLKAD is a clock signal. Every time this clock signal is received via the terminal CLKAD, the A/D conversion unit 108 described above performs A/D conversion.

First of all, after the signals VST and CLKV are set at High level, the selection signals Sel0 to Sel3 are sequentially set at High level to sequentially select the sensor units $106_0$ to $106_3$. The signal HST is set at High level at the timing when the selection signal Sel is set at High level. During this period, the clock signal CLKH and CLKAD are input.

When the imaging apparatus 100 is controlled in the above manner, in, for example, the first period T1 in FIG. 6, signal readout is performed from the respective sensors S on the first row of each of the sensor units $106_0$ to $106_3$. More specifically, first of all, A/D conversion is sequentially performed on signals obtained by the respective sensors S on the first row of the sensor unit $106_0$ from the first column to the nth column. Subsequently, likewise, A/D conversion is performed on signals obtained by the respective sensors S on the first row of the sensor unit $106_1$. Furthermore, likewise, A/D conversion is sequentially performed on signals obtained by the respective sensors S on the first row of each of the sensor units $106_2$ and $106_3$.

Signal readout in a second period T2 (signal readout from the respective sensors S on the second row of each sensor unit 106) and subsequent periods is the same as that in the first period T1.

First Embodiment

The first embodiment will be described with reference to FIGS. 7 to 9.

Figure 7:
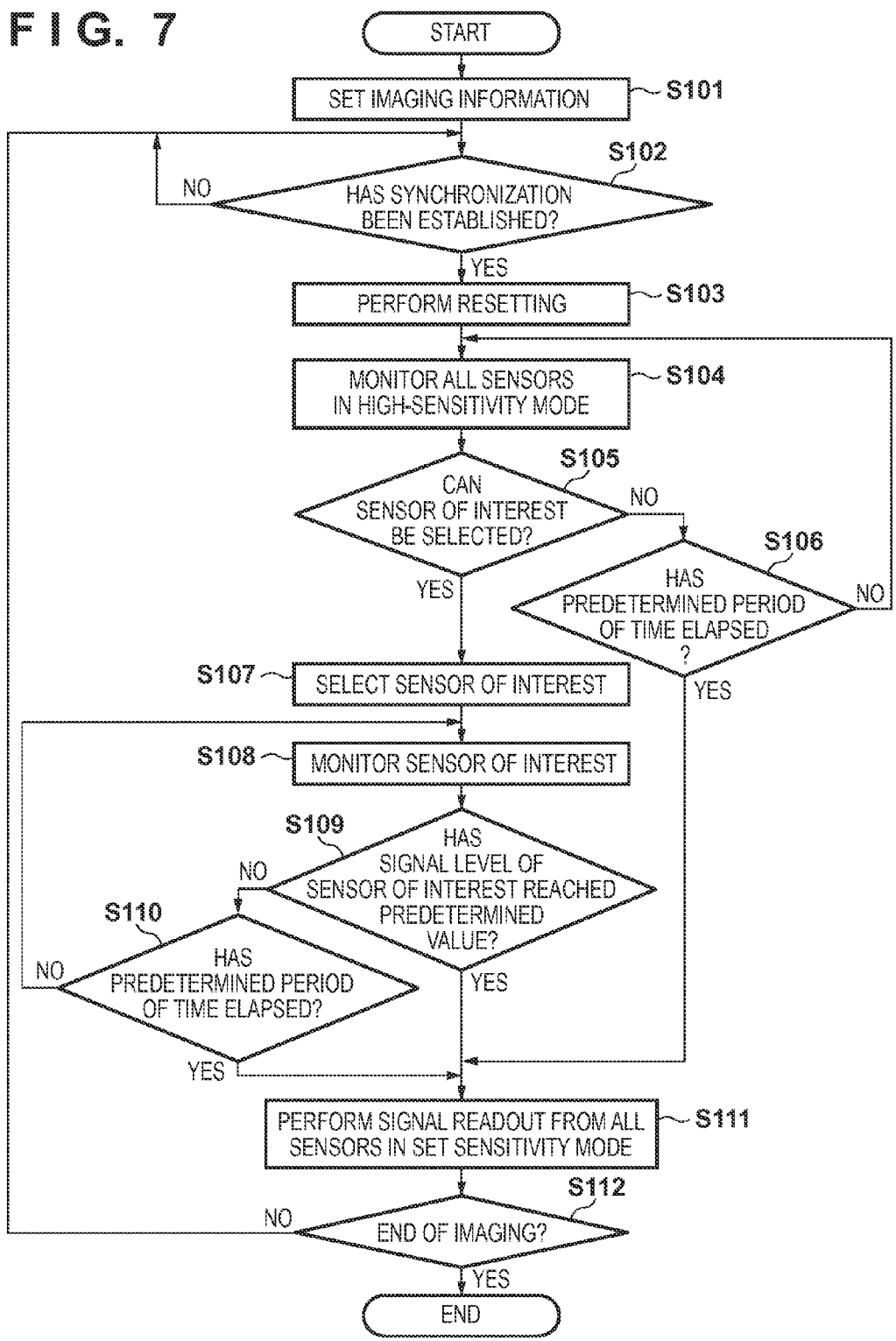
FIG. 7 is a flowchart for explaining an example of a control method for the radiation imaging apparatus.

FIG. 7 is a flowchart showing a control method for an imaging apparatus 100 according to this embodiment. In step S101 (to be simply referred to as "S101" hereinafter, and the same applies to other steps), the user sets information necessary to perform imaging such as an operation mode. Upon checking in S102 that the imaging apparatus 100 is set in a standby state by synchronous control, the process advances to S103.

In S103, the above reset driving RD is performed to initialize all sensors S and the like. Together with this operation, the charges generated in the respective sensors S are accumulated in the sensors S. At this time, each sensor S is set in the high-sensitivity mode (a signal WIDE is set at Low level), and hence detects radiation with high accuracy even immediately after the start of the irradiation of radiation (in a period in which the radiation dose of irradiation is still small).

In S104, a control unit 109 non-destructively reads out, from all the sensors S, signal levels based on the amounts of charges generated after S103. In other words, the control unit 109 includes a monitor unit, and monitors signal levels based on the amounts of charges generated in all the sensors S.

In this case, the control unit 109 can determine the intensity distribution of irradiated radiation based on the signal levels (monitoring results) of all the sensors S. The absorptance of radiation varies depending on the region (imaging target) of a subject to be examined. For this reason, as will be described later, the control unit 109 specifies one of all the sensors S which should be continuously monitored, to image an imaging target with high quality, while referring to the above intensity distribution of radiation. That is, the control unit 109 selects a sensor, out of all the sensors S, to which attention should be paid.

In S105, it is determined whether the signal levels of all the sensors S are higher than a predetermined value (have reached the predetermined value). If the signal levels are not higher than the predetermined value, the process advances to S106. If the signal values are higher than the predetermined value, the process advances to S107.

In S106, it is determined whether a predetermined time has elapsed since the reset driving RD in S103 (the start of accumulation in each sensor S). If the predetermined time has not elapsed, the process returns to S104. If the predetermined time has elapsed, the process advances to S111. Note that the predetermined time can be arbitrarily set to, for example, the upper limit value of the charge accumulation time in each sensor S or the upper limit value of the time during which radiation can be irradiated.

That is, according to S104 to S106, signal levels of all the sensors S are periodically monitored, and if the signal levels exceed the predetermined value, the process advances to S107. When the predetermined period of time has elapsed even though the signal levels do not exceed the predetermined value, the process advances to S111. Note that S106 may be executed based on the elapsed time since the start of the irradiation of radiation. Each criterion is preferably set to prevent the irradiation of an excessive dose of radiation.

In S107, the control unit 109 selects some sensors S, out of all the sensors S, which should be continuously monitored, while referring to the intensity distribution of radiation obtained in S104 and S105, based on, for example, the imaging information set in S101. That is, that control unit 109 selects some of all the sensors S based on the imaging information. Alternatively, the processing unit 101 may select some of all the sensors S, and output a control signal to the control unit 109 so as to continuously monitor signal levels of the selected some sensors.

A selected sensor will be referred to as a "sensor of interest" hereinafter. Note that the predetermined value described in S105 can be arbitrarily set as long as it is a signal level enough to select a sensor of interest.

In S108, the signal level of the sensor of interest selected in S107 is monitored (that is, non-destructively read out). In this case, the sensor of interest is set in the sensitivity mode set in S101. More specifically, when the low-sensitivity mode is set, the signal WIDE is set at High level. When the high-sensitivity mode is set, the signal WIDE is kept at Low level.

In S109, it is determined whether the signal level of the sensor of interest is higher than the predetermined value. If the signal level is not higher than the predetermined value, the process advances to S110. If the signal level is higher than the predetermined value, the process advances to S111.

In S110, it is determined whether a predetermined time has elapsed since the reset driving RD in S103. If the predetermined time has not elapsed, the process returns to S108. If the predetermined time has elapsed, the process advances to S111.

That is, according to S108 to S110, the signal level of the sensor of interest selected in S107 is periodically monitored, and if the signal level exceeds the predetermined value, the process advances to S111. When the predetermined time has elapsed even though the signal level does not exceed the predetermined value, the process advances to S111.

In S111, the above sampling driving SD is performed to read out signals from all the sensors S in the sensitivity mode set in S101.

In S112, it is determined whether imaging is complete. If imaging is not complete, the process returns to S102. If imaging is complete, the imaging is ended, and the process shifts to the next imaging operation as needed.

According to the above control sequence, it is possible to simplify a monitoring operation by monitoring the signal levels of some of all the sensors S based on imaging information, that is, sensors of interest. Even when imaging is to be performed in the low-sensitivity mode, a sensor of interest can be specified with high accuracy by operating in the high-sensitivity mode until a sensor of interest is selected. After a sensor of interest is selected, the signal level of the sensor of interest is monitored instead of monitoring all the sensors. This is advantageous in increasing the speed and accuracy of monitoring.

Note that the number of sensors of interest may be one or two or more. When the number of sensors of interest is two or more, these two or more sensors of interest need not be located together in one place on a sensor array 10 and may be discretely selected from all the sensors S.

Note that there has been exemplified the mode in which after a sensor of interest is selected (S108), each sensor S is set in the sensitivity mode set in S101. However, the timing of switching the sensitivity modes is not limited to that in this mode. For example, the sensitivity modes may be switched after the signal level of a sensor of interest is saturated. The sensitivity modes are preferably switched at the timing when the signal levels of any of the sensors S are not saturated.

In addition, a monitoring operation on signal levels which is performed in S104 to S106 may be performed by simple readout exemplified below in order to speed up the operation.

Figure 8:
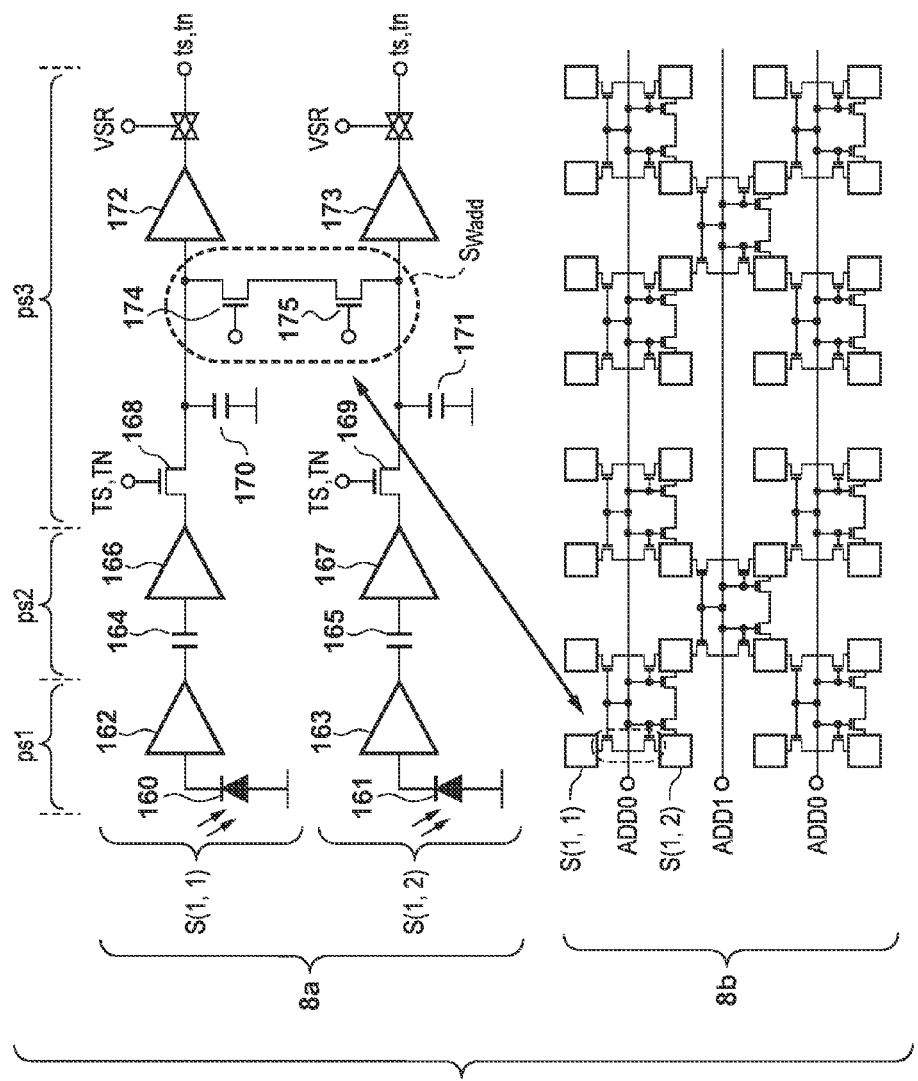
FIG. 8 is a circuit diagram for explaining an example of a simple readout method.

FIG. 8 is a view for explaining an example of a method of performing simple readout of signals from the respective sensors S. (A) in FIG. 8 shows, in a simplified form, a first portion ps1, a second portion ps2, and a third portion ps3 of each of adjacent sensors S(1, 1) and S(1, 2).

That is, in the sensor S(1, 1), a diode 160 corresponds to the photodiode PD in FIG. 2, and a circuit unit 162 corresponds to the transistors M1 to M4 in FIG. 2. A capacitor 164 corresponds to the clamp capacitor $C_{CL}$ in FIG. 2. A circuit unit 166 corresponds to the transistors M5 to M7 in FIG. 2.

In addition, a switch 168 corresponds to the transistor M8 (or M11) in FIG. 2. A capacitor 170 corresponds to the capacitor CS (or CN) in FIG. 2, and a circuit unit 172 corresponds to the transistor M10 (or M13) in FIG. 2. Note that for the sake of descriptive convenience, the first unit $U_{SHS}$ and the second unit $U_{SHN}$ described above are collectively shown.

The same as described above about the sensor S(1, 1) applies to a diode 161, circuit units 163, 167, and 173, a switch 169, and capacitors 165 and 171 in the sensor S(1, 2).

The capacitors 170 and 171 are connected to each other via an addition switch $SW_{add}$ (transistors 174 and 175 in this case) as a connecting unit. Rendering the addition switch $SW_{add}$ conductive will obtain the average of the voltages of the capacitors 170 and 171. That is, the signal levels of the sensors S(1,) and S(1, 2) are averaged.

(B) in FIG. 8 exemplifies the connection relationship, based on the addition switch $SW_{add}$, between the adjacent sensors S in the sensor array 10. Rendering the addition switch $SW_{add}$ conductive by using control signals ADD0 and ADD1 will average the signal levels of the adjacent sensors S.

For example, the signal levels of the four sensors S of 2 rows×2 columns are averaged by activating the control signal ADD0. This makes it possible to monitor signal levels for every four sensors as a unit and quadruple the frame rate for the monitoring operation. Furthermore, the signal levels of the 16 sensors S of 4 rows×4 columns are averaged by activating the control signals ADD0 and ADD1. This makes it possible to monitor signal levels for every 16 sensors as a unit and increase the frame rate for the monitoring operation by 16 times.

Figure 9:
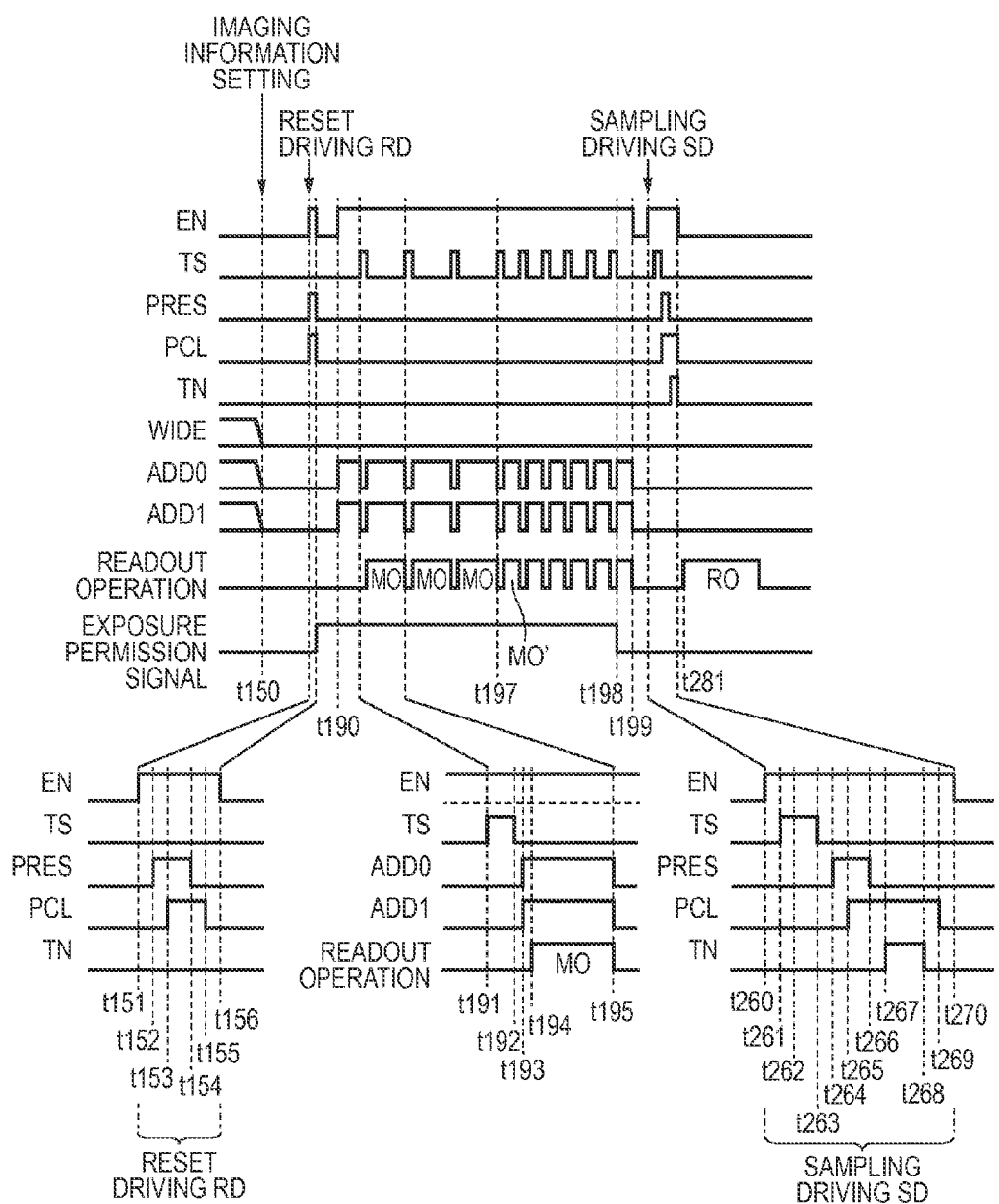
FIG. 9 is a timing chart for explaining an example of a control method for the radiation imaging apparatus.

FIG. 9 is a timing chart for explaining a control method for the imaging apparatus 100 according to this embodiment. An operation at times t150 to t156 in FIG. 9 is the same as that at times t50 to t56 described above (FIG. 3), and hence a description of the operation will be omitted.

At time t190, an enable signal EN is set at High level to render the transistors M3 and M6 conductive. This makes the transistors M4 and M7 be ready for a source follower operation. The signal levels of the 16 sensors S of 4 rows×4 columns may be averaged by setting the control signals ADD0 and ADD1 at High level while setting the enable signal EN at High level.

At time t191, a signal TS is set at High level to render the transistor M8 conductive. This makes the capacitor CS hold a signal level based on the amount of charges generated in each sensor S. Thereafter, at time t192, the signal TS is set at Low level to render the transistor M8 non-conductive to fix the signal level to the capacitor CS. During this period, a signal TN may be activated to hold a noise level in the capacitor CN.

At time t193, the signals ADD0 and ADD1 are set at High level to perform simple readout (see FIG. 8) for every 16 sensors S of 4 rows×4 columns as a unit. At time t194, a monitoring operation MO for signal levels is performed by simple readout for every 16 sensors S of 4 rows×4 columns as a unit. This simple readout is advantageous in performing the monitoring operation MO in a short time. As described above, the monitoring operation MO is performed by non-destructive readout. At time t195, the signals TS, ADD0, and ADD1 are set at Low level.

The above monitoring operation MO at times t191 to t195 is repeatedly performed based on the above operation (FIG. 7) in S104 to S106 until the above sensor of interest is selected. In this case, for the sake of descriptive convenience, assume that a sensor of interest has been selected when the above operation was performed three times. The subsequent operation will be described below.

An operation between times t197 and t198 is based on the above operation (FIG. 7) in S107 to S110. At time t197, a sensor of interest is selected. Thereafter, a monitoring operation MO' for the signal level of the sensor of interest is repeatedly performed instead of monitoring all the sensors S. This monitoring operation can therefore be performed at high speed with high accuracy. Subsequently, at time t198, it is determined that the signal level of the sensor of interest is higher than the predetermined value. In response to this determination, an exposure permission signal 114 is set at Low level (inhibited). Note that during this period, the signals ADD0 and ADD1 need not be activated.

At time t199, the enable signal EN is set at Low level to render the transistors M3 and M6 non-conductive and render the transistors M4 and M7 non-conductive. This terminates the monitoring operation MO'.

The subsequent operation at times t260 to t281 is the same as the above operation (FIG. 3) at times t60 to t81, and hence a description of the operation will be omitted.

As described above, according to this embodiment, a monitoring operation can be simplified by monitoring the signal levels of some sensors (sensors of interest), of all the sensors S, which are based on imaging information. A monitoring operation may be performed by simple readout to speed up the operation. When imaging is performed in the low-sensitivity mode, each sensor S is set in the high-sensitivity mode until a sensor of interest is selected. This makes it possible to specify a sensor of interest with high accuracy. After a sensor of interest is selected, the signal level of the sensor of interest is monitored. This scheme obviates the necessity to perform a monitoring operation for all the sensors S, and hence is advantageous in increasing the speed and accuracy of monitoring. Subsequently, when the signal level of the sensor of interest becomes higher than the predetermined value, the irradiation of radiation may be finished, and signal readout may be performed from all the sensors S. As described above, this embodiment is advantageous in improving the performance of the radiation imaging apparatus.

Note that this embodiment has exemplified the mode in which simple readout is performed for every four sensors S of 2 rows×2 columns as a unit or every 16 sensors of 4 rows×4 columns as a unit. However, the number of sensors as a unit may be changed to 32 rows×32 columns or 128 rows×128 columns. In addition, a circuit may be configured to allow the user to arbitrarily change the number of sensors as a unit.

Second Embodiment

The second embodiment will be described with reference to FIGS. 10 to 12.

According to the first embodiment described above, since a monitoring operation is repeatedly performed while charges generated in each sensor S are accumulated, the temperature of each unit including the sensor array 10 rises. This can cause thermal noise. In addition, the repeated monitoring operation can increase the power consumption.

In the second embodiment, therefore, the time when the signal level of a sensor of interest becomes higher than a predetermined value is calculated (or estimated) based on a monitoring result on the signal level of the sensor of interest, and the monitoring operation is finished. Signal readout is then performed from all the sensors S in the calculated time, and the irradiation of radiation is finished. This embodiment obtains the same effects as those of the first embodiment. In addition, since the number of times of monitoring a sensor of interest is decreased, the embodiment reduces the influence of thermal noise, and is also advantageous in reducing the power consumption.

Figure 10:
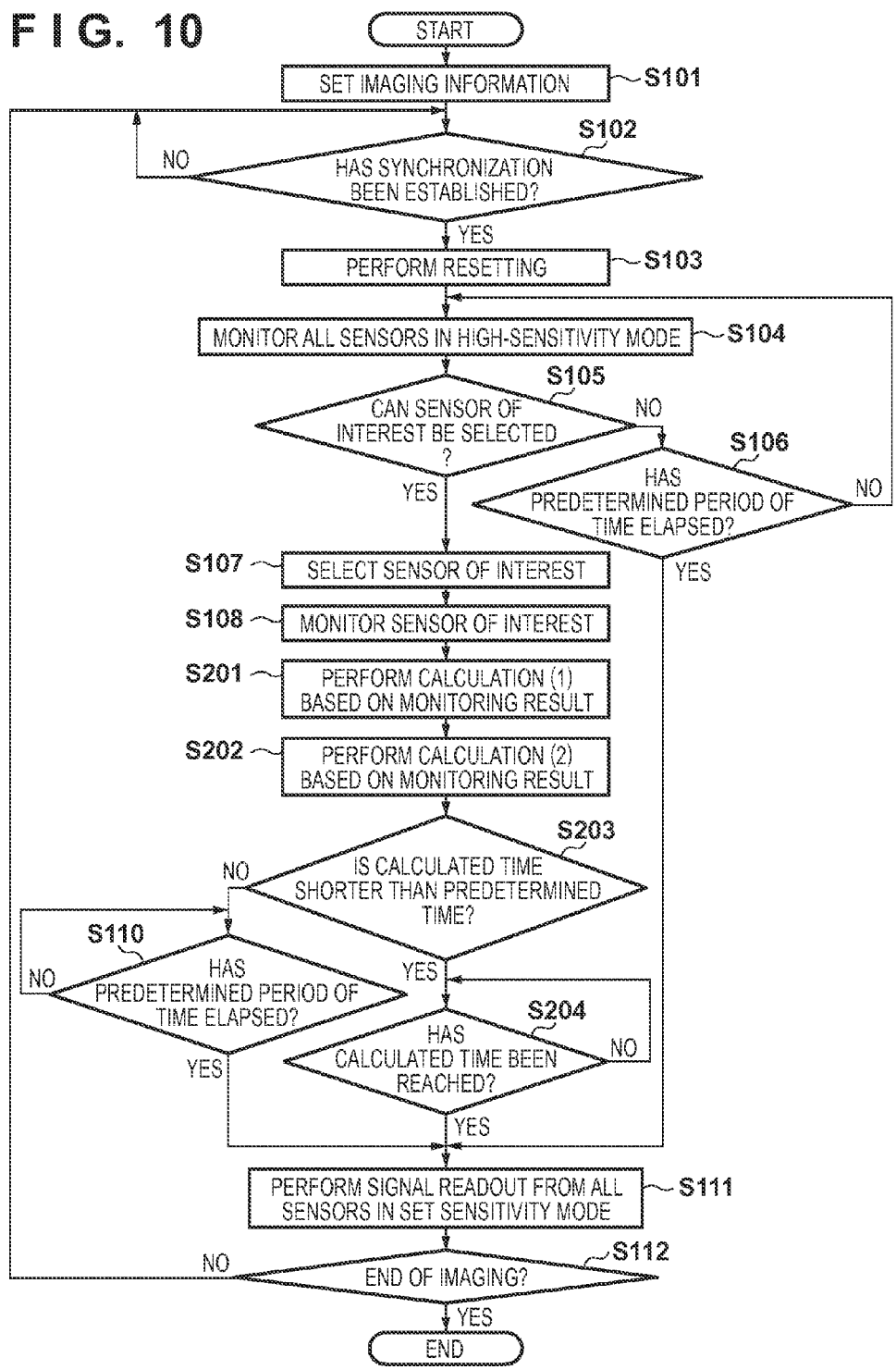
FIG. 10 is a flowchart for explaining an example of the control method for the radiation imaging apparatus.

FIG. 10 is a flowchart showing a control method for an imaging apparatus 100 according to this embodiment. Referring to FIG. 10, the same step numbers as in the first embodiment denote steps with the same contents as in the first embodiment. Therefore, differences from the first embodiment will be described below.

After the signal level of a sensor of interest is monitored in S108, the time dependence of the signal level is calculated based on the monitoring result in S201. More specifically, the amount of change in signal level per unit time is acquired, and a linear expression of a signal level is calculated as a function of time.

In S202, the time when the signal level of the sensor of interest becomes higher than the predetermined value is calculated based on the linear expression calculated in S201.

In this case, FIG. 11 shows signal levels from the imaging apparatus 100 when copper plates having different thicknesses are X-ray imaged, with the abscissa representing the radiation irradiation time [ms(msec)], and the ordinate representing pixel values [LSB] corresponding to the signal levels. It is obvious from FIG. 11 that radiation irradiation time and pixel value have an almost proportional relationship, and the time dependence of a signal level can be calculated as a linear expression.

In S203, it is determined whether the time calculated in S202 is shorter than a predetermined time. If the calculated time is shorter than the predetermined time, the process advances to S204; otherwise, the process advances to S110. Note that the predetermined time can be arbitrarily set to, for example, the upper limit value of the charge accumulation time in each sensor S or the upper limit value of the time during which radiation can be irradiated, in accordance with specifications and the like, as in the above case (first embodiment).

In S204, it is determined whether the time calculated in S202 has elapsed. When the calculated time has elapsed, the process advances to S111.

Figure 12:
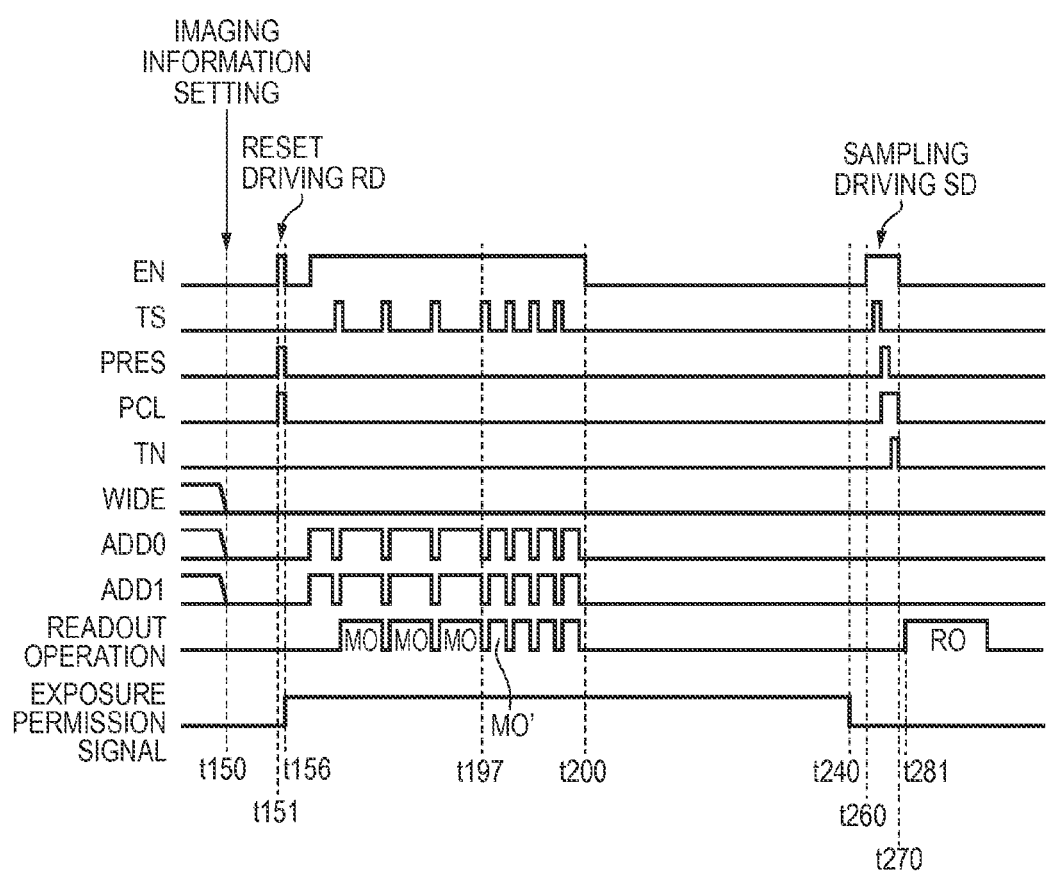
FIG. 12 is a timing chart for explaining an example of the control method for the radiation imaging apparatus.

FIG. 12 is a timing chart for explaining a control method for the imaging apparatus 100 according to this embodiment. An operation at times t150 to t156 in FIG. 12 is the same as that in the first embodiment (see FIG. 9), and hence a description of the operation will be omitted.

An operation between times t197 and t200 corresponds to the above operation (FIG. 10) in S108, S201, and S202. At time t197, a sensor of interest is selected. Thereafter, a monitoring operation MO' is repeatedly performed (four times in this case) for the signal level of the sensor of interest until time t200. The time (time t240) when the signal level becomes higher than the predetermined value is calculated based on these monitoring results. In addition, at time t200, an enable signal EN is set at Low level to finish the monitoring operation MO'.

Subsequently, at time t240, it is determined that the signal level of the sensor of interest has become higher than the predetermined value, and the exposure permission signal 114 is set at Low level (inhibited) in response to the determination.

An operation at times t260 to t281 in FIG. 12 is the same as that in the first embodiment (see FIG. 9), and hence a description of the operation will be omitted.

As described above, this embodiment obtains the same effects as those of the first embodiment. In addition, since the number of times of monitoring a sensor of interest is decreased, the embodiment reduces the influence of thermal noise, and is also advantageous in reducing the power consumption.

Third Embodiment

The third embodiment will be described with reference to FIGS. 13A to 14.

According to the second embodiment, the signal level of a selected sensor of interest is monitored only an arbitrary number of times. The time when the signal level of the sensor of interest becomes higher than the predetermined value is then calculated based on the monitoring results, and the monitoring operation is finished. Third embodiment differs from the second embodiment in that before the time calculated based on the monitoring result on the signal level of a sensor of interest, the signal level of the sensor of interest is monitored again. This embodiment can more accurately finish the irradiation of radiation and perform signal readout from all the sensors S while reducing thermal noise and power consumption.

Figure 13A:
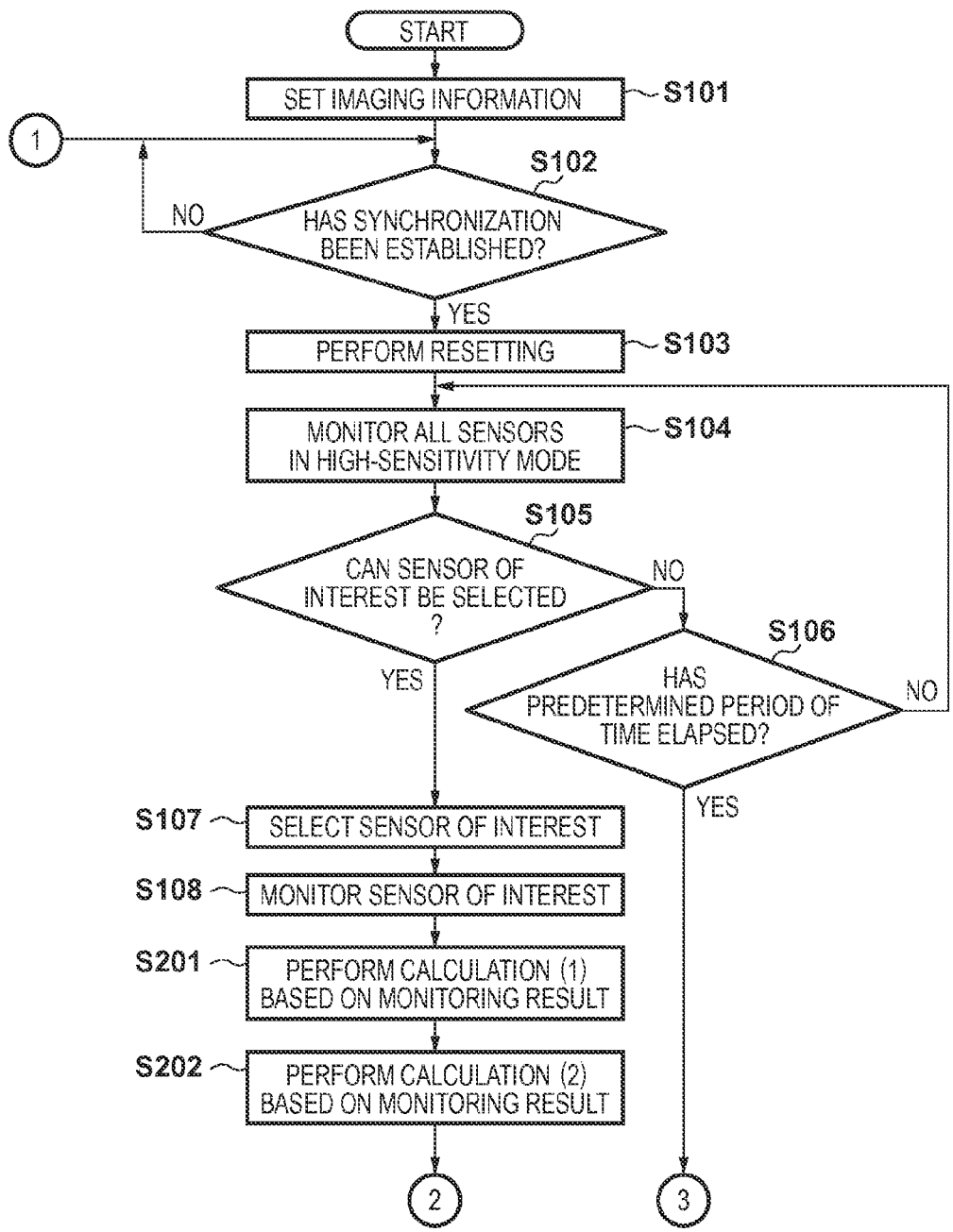
FIGS. 13A and 13B are a flowchart for explaining an example of the control method for the radiation imaging apparatus.
Figure 13B:
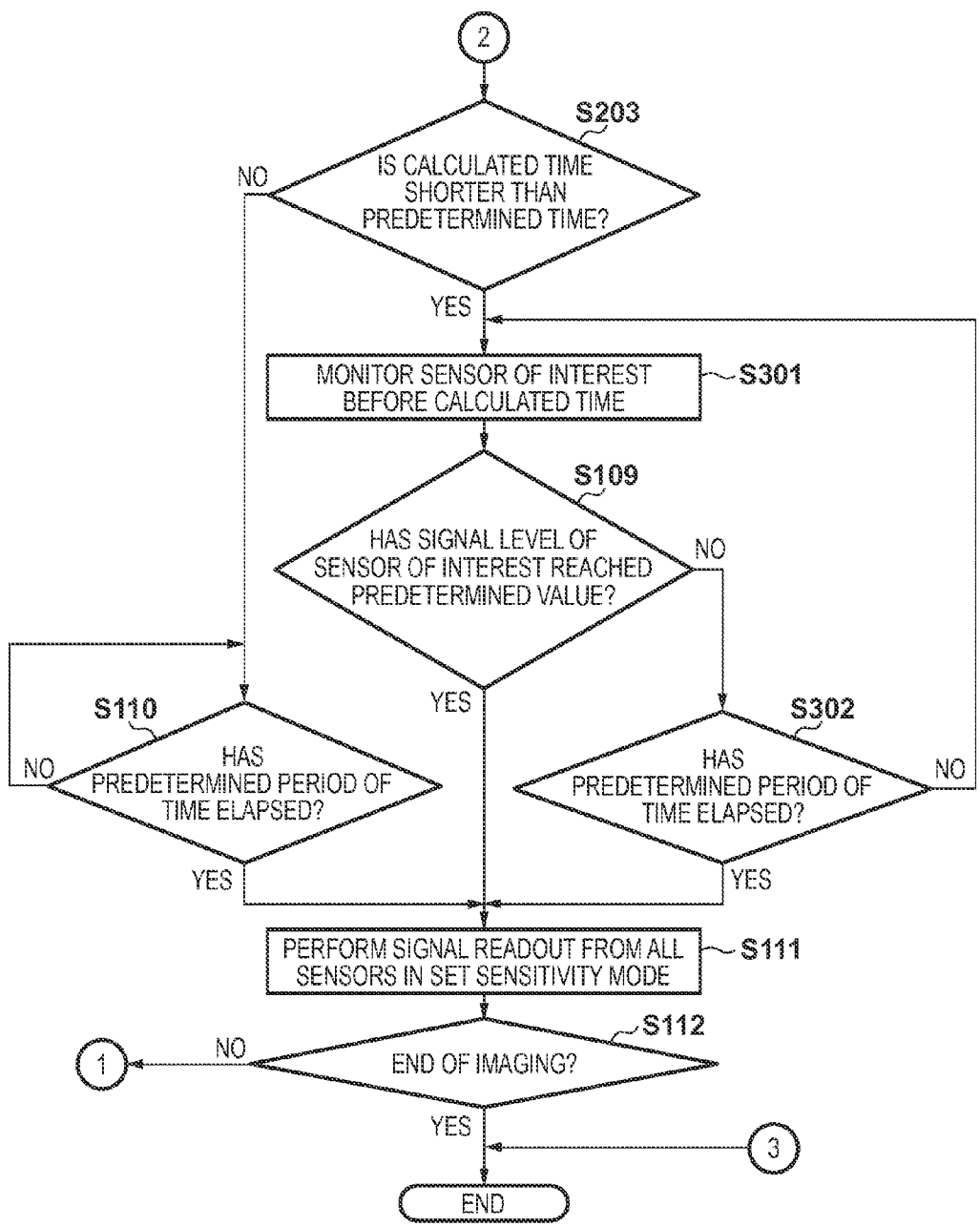

FIGS. 13A and 13B are a flowchart showing a control method for an imaging apparatus 100 according to this embodiment. Referring to FIGS. 13A and 13B, the same step numbers as in the first embodiment denote steps with the same contents as in the first and second embodiments. Therefore, differences from the second embodiment will be described below. In S203, it is determined whether the time calculated in S202 is shorter than a predetermined time. If the calculated time is shorter than the predetermined time, the process advances to S301; otherwise, the process advances to S110. Note that the predetermined time can be arbitrarily set to, for example, the upper limit value of the charge accumulation time in each sensor S or the upper limit value of the time during which radiation can be irradiated, in accordance with specifications and the like, as described above.

In S301, before the time calculated in S202, the monitoring operation for the signal level of a sensor of interest is resumed. Thereafter, if it is determined in S109 that the signal level of the sensor of interest obtained by monitoring in S301 is higher than the predetermined value, the process advances to S111; otherwise, the process advances to S302. Note that the timing of S301 may be arbitrarily set in accordance with specifications and the like as long as it is set slightly before the time calculated in S202.

In S302, it is determined whether a predetermined period of time has elapsed since reset driving RD in S103. If the predetermined period of time has not elapsed, the process returns to S301; and otherwise, the process advances to S111.

Figure 14:
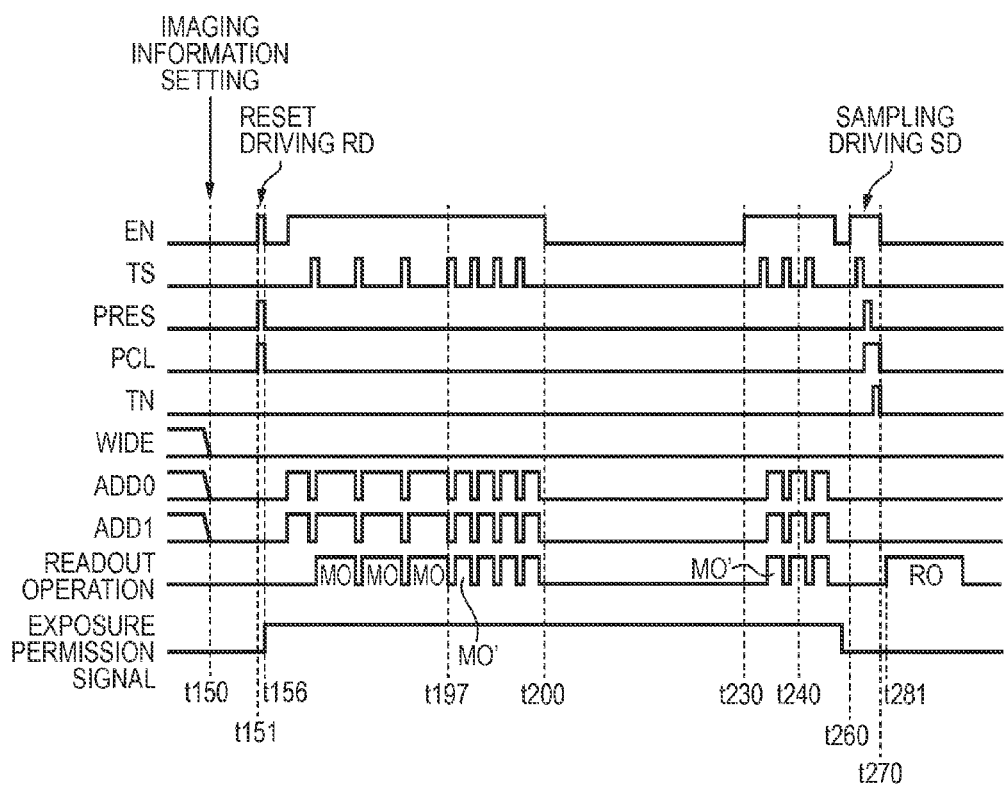
FIG. 14 is a timing chart for explaining an example of the control method for the radiation imaging apparatus.

FIG. 14 is a timing chart for explaining a control method for the imaging apparatus 100 according to this embodiment. An operation at times t150 to t156 in FIG. 14 is the same as that in the first embodiment (see FIG. 9), and hence a description of the operation will be omitted. In addition, an operation between times t197 and t200 is the same as that in the second embodiment (see FIG. 12).

Time t230 is earlier than time t240 calculated in the second embodiment. After a monitoring operation MO' for the signal level of a sensor of interest is interrupted at time t200, the monitoring operation MO' is resumed based on S301 described above at time t230. It is then determined whether the signal level of the sensor of interest obtained by the resumed monitoring operation is higher than the predetermined value. If the signal level is higher than the predetermined value, signal readout is performed from all sensors S, and the irradiation of radiation is finished. Note that even if the signal level is lower than the predetermined value, when the predetermined time has elapsed, signal readout is performed from all the sensors S, and the irradiation of radiation is finished.

An operation at times t260 to t281 in FIG. 14 is the same as described above (the first embodiment), and hence a description of the operation will be omitted.

This embodiment can more accurately finish the irradiation of radiation and perform signal readout from all the sensors S while reducing thermal noise and power consumption.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-009784, filed Jan. 22, 2014, which is hereby incorporated by reference herein in its entirety.

What is claimed is:

1. A radiation imaging apparatus comprising:
a plurality of sensors configured to detect radiation with a first sensitivity or a second sensitivity higher than the first sensitivity;
a signal readout unit configured to read out a signal from the plurality of sensors; and
a computer with CPU and memory, programmed to
perform first control to control the signal readout unit to read out a signal from each of the plurality of sensors with the second sensitivity, and
perform second control to select one or more sensors out of the plurality of sensors based on a readout result obtained in the first control, for determining a timing to perform a readout by the signal readout unit from the plurality of sensors with the first sensitivity or the second sensitivity.

2. The apparatus according to claim 1, wherein when performing imaging upon setting each sensor to the first sensitivity, the computer further performs third control to control a readout operation for signal levels based on the amounts of charges generated in the plurality of sensors, based on signal levels based on the amounts of charges generated in the sensors with the first sensitivity selected in the second control.

3. The apparatus according to claim 1, wherein information for specifying an imaging target of a subject to be examined is set in advance before the first control, and
the computer selects some sensors out of the plurality of sensors in the second control based on the set information and monitoring results obtained in the first control.

4. The apparatus according to claim 2, wherein the computer performs the third control so as to read out signal levels based on the amounts of charges generated in the plurality of sensors, in a case where the signal levels based on the amounts of charges generated in sensors selected in the second control reach a predetermined value.

5. The apparatus according to claim 2, wherein the computer
calculates a time when signal levels based on the amounts of charges generated in sensors selected in the second control reach a predetermined value, after the second control and before the third control based on monitoring results obtained by the monitor unit, and
determines, after the second control and before the calculated time, whether the signal levels have reached the predetermined value.

6. The apparatus according to claim 1, wherein the computer periodically monitors signal levels based on the amounts of charges generated in the plurality of sensors in the first control.

7. The apparatus according to claim 1, further comprising a holding unit configured to hold a signal level based on amounts of charges generated in each sensor, wherein the holding unit includes a switch and a capacitor provided in correspondence with each sensor.

8. The apparatus according to claim 7, further comprising a connecting unit configured to connect the capacitors corresponding to adjacent sensors,
wherein the computer adds signal levels based on amounts of charges generated in the adjacent sensors by using the connecting unit in the first control.

9. The apparatus according to claim 2, wherein the computer outputs a control signal to start irradiation of radiation before performing the first control, and outputs a control signal to end irradiation of radiation when performing the third control.

10. The apparatus according to claim 1, wherein the computer outputs a control signal to start irradiation of radiation before performing the first control, and when a predetermined time has elapsed since a start of the irradiation of radiation, performs control to read out signal levels based on amounts of charges generated in the plurality of sensors, and outputs a control signal to end the irradiation of radiation.

11. The apparatus according to claim 7, wherein the computer initializes the plurality of sensors and the holding unit before the first control.

12. A radiation inspection apparatus comprising:
a radiation imaging apparatus defined in claim 1;
a radiation source configured to generate radiation; and
a radiation source control unit configured to control the radiation source.

13. A control method for a radiation imaging apparatus, the apparatus including a plurality of sensors configured to detect radiation with a first sensitivity or a second sensitivity higher than the first sensitivity, the method comprising:
reading out a signal from each of the plurality of sensors with the second sensitivity; and
selecting one or more sensors out of the plurality of sensors based on a result of the reading out, for determining a timing to perform a readout from the plurality of sensors with the first sensitivity or the second sensitivity.

14. The method according to claim 13, further comprising, when performing imaging upon setting each sensor in the first mode, controlling a readout operation for signal levels based on the amounts of charges generated in the plurality of sensors, based on signal levels based on the amounts of charges generated in the sensors with the first sensitivity selected in the second control.

15. A non-transitory computer-readable medium storing a computer-executable program for causing a computer to perform the control method according to claim 13.

16. A radiation imaging apparatus comprising:
a plurality of sensors arrayed so as to form a plurality of rows and a plurality of columns, each configured to detect radiation with a first sensitivity or a second sensitivity higher than the first sensitivity;
a plurality of control lines corresponding to the plurality of rows, each connected to each sensor in the corresponding row;
a plurality of column signal lines corresponding to the plurality of columns, each connected to each sensor in the corresponding column;
a signal readout unit configured to read out a signal from the sensor, which is controlled by the signal line, via the column signal line; and
a computer with CPU and memory,
wherein the computer is programmed to perform first control to control the plurality of sensors using the plurality of control lines and to control the signal readout unit to read out a signal via the plurality of column signal lines from each of the plurality of sensors with the second sensitivity, and
second control
to control one or more sensors out of the plurality of sensors using the corresponding control lines based on a readout result in the first control, for determining a timing to perform a readout by the signal readout unit from the plurality of sensors with the first sensitivity or the second sensitivity, and
then to control the signal readout unit to read out signals from the one or some sensors via the corresponding column signal lines.

17. A radiation imaging apparatus comprising:
a plurality of sensors arrayed so as to form a plurality of rows and a plurality of columns, each configured to detect radiation with a first sensitivity or a second sensitivity higher than the first sensitivity;
a plurality of control lines corresponding to the plurality of rows, each connected to each sensor in the corresponding row;
a vertical scanning circuit configured to control, by the control lines, the corresponding sensor;
a plurality of column signal lines corresponding to the plurality of columns, each connected to each sensor in the corresponding column;
a plurality of switches connected to the plurality of column signal lines, respectively;

a horizontal scanning circuit configured to control the switch to output, via the column signal line, a signal from the corresponding sensor; and a signal readout unit configured to read out a signal which is output by the switch, wherein the signal readout unit reads out a signal from each of the plurality of sensors with the second sensitivity controlled by the vertical scanning circuit using the plurality of control lines, the signal being output via the plurality of column signal lines and by plurality of the switches, the vertical scanning circuit controls one or some sensors out of the plurality of sensors using the corresponding control lines based on a readout result of the signal readout unit, for determining a timing to perform a readout by the signal readout unit from the plurality of sensors with the first sensitivity or the second sensitivity, and then the signal readout unit reads out a signal, from the one or some sensors, which is output via the corresponding column signal lines and by the corresponding switches.

* * * * *